J. VAN DER WALT.
ANIMAL TRAP.
APPLICATION FILED NOV. 8, 1909.
1,031,892.
Patented July 9, 1912.
2 SHEETS—SHEET 1.
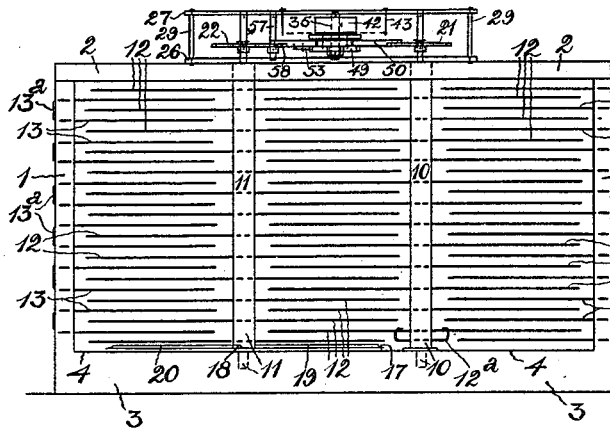
Fig. 1.
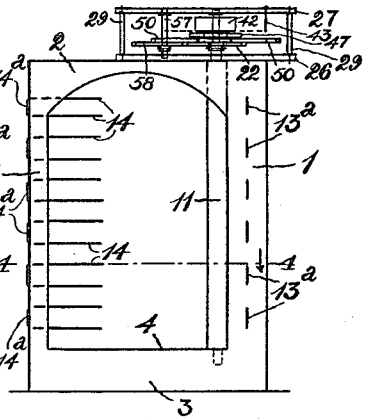
Fig. 2.
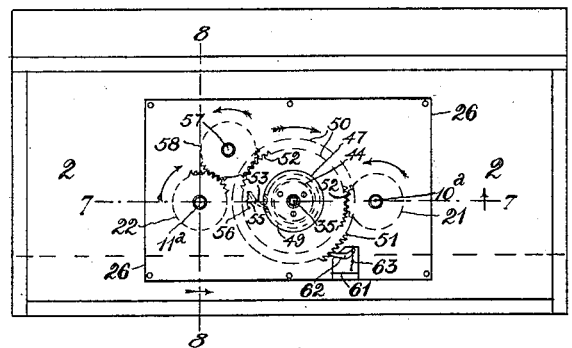
Fig. 3.
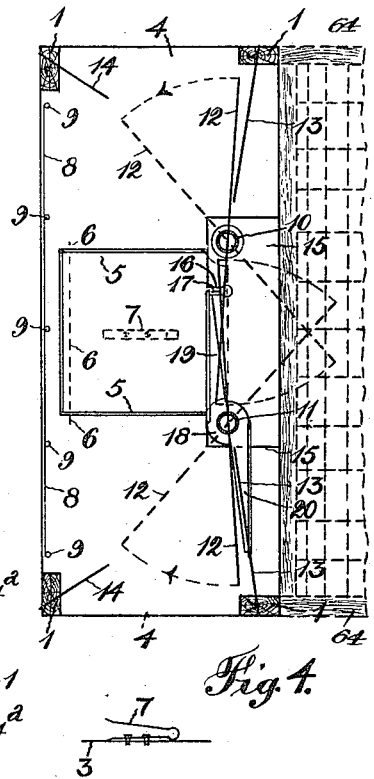
Fig. 4.
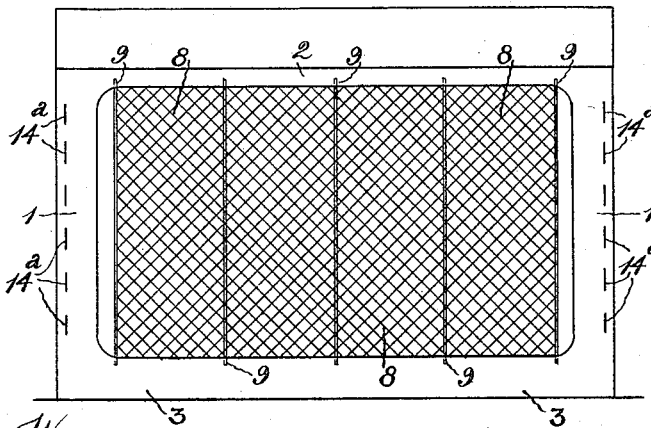
Fig. 5.
Fig. 6.
Witnesses:
Chas. Ovendale
J. Ovendale
Inventor:
Jacobus van der Walt

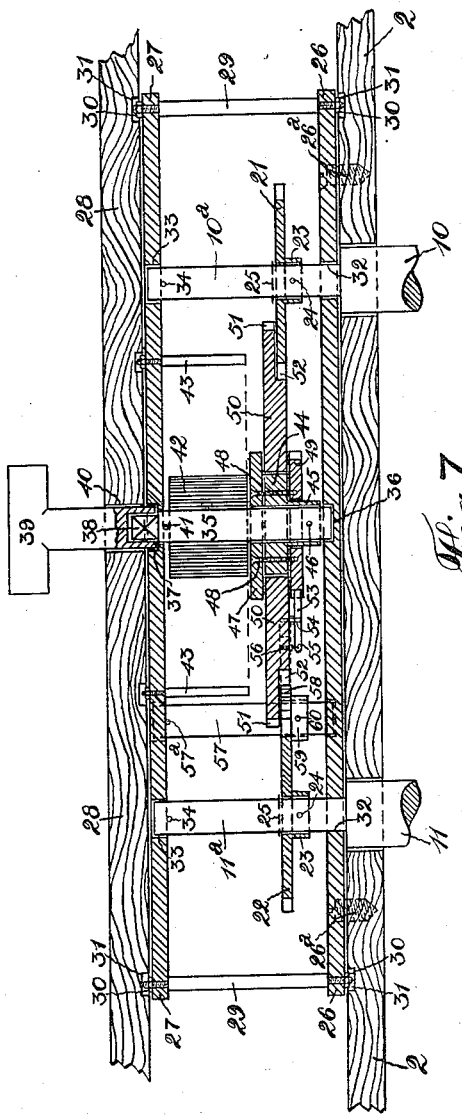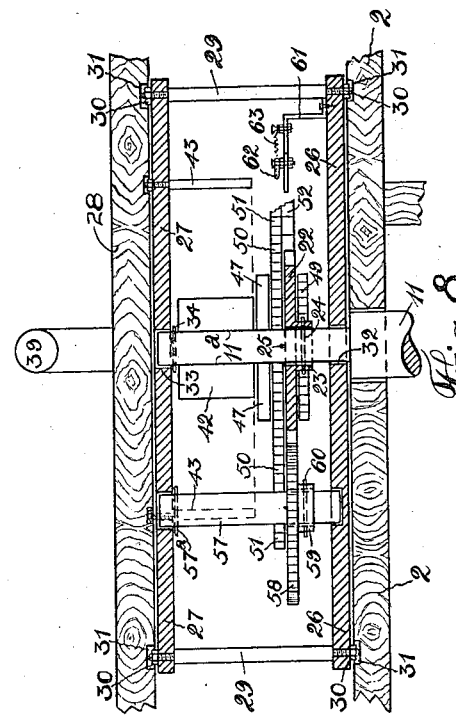

ically arranged equi-distant from each other and from the uprights 1 at the same side. The rods 10, 11, each carry a number of parallel and horizontal wires or bars 12. The wires or bars 12, fixed to the one rod or tube 10, are so arranged and spaced apart that they take up positions and work between wires 12 of the other rod or tube 11—as shown in the space between the rods 10, 11, in Fig. 1. The wires 12, carried by the rod or tube 10, project on the one side to within a short distance of the rod or tube 11, and on the other side to within a short distance of the upright 1. In like manner, the wires or bars 12 of the rod or tube 11 project on the one side to within a short distance of the rod or tube 10, and on the other side to within a short distance of the upright 1 at the opposite end of the trap.

As shown more particularly in Figs. 1 and 4, to each of the back uprights or vertical members 1, are fixed horizontal wires, rods or their equivalent 13. The wires 13, as shown in Fig. 4, are inwardly inclined or directed toward the rods 10, 11. The said wires 13 are so arranged and spaced apart that the wires 12, carried by the rotatable vertical rods or tubes 10, 11, take up positions and work between them when rods or tubes 10, 11, are rotated. The wires 13, as shown, project to within a short distance of the rods or tubes 10, 11,—as shown in Figs. 1 and 4. The wires 13, as shown in Figs. 1 and 2, may be connected in pairs at their
---

UNITED STATES PATENT OFFICE.

JACOBUS VAN DER WALT, OF WITPOORTJE, TRANSVAAL.

ANIMAL-TRAP.

1,031,892.      Specification of Letters Patent.      Patented July 9, 1912.

Application filed November 8, 1909. Serial No. 526,819.

*To all whom it may concern:*

Be it known that I, JACOBUS VAN DER WALT, a subject of the King of Great Britain, and resident of Witpoortje, Transvaal, have invented certain new and useful Improvements in Animal-Traps, of which the following is a specification.

This invention relates to animal traps.

It may be utilized in the construction of traps for trapping vermin such as rats, mice and other small quadrupeds, or in traps intended for trapping quadrumanous animals, such as apes, monkeys, squirrels, etc., or in traps for larger animals, such as lions, tigers, hyenas, foxes, wolves, hares, rabbits or game or birds.

The object of my invention is to construct an efficient trap in a simple and inexpensive manner.

The invention consists in the construction and arrangement of the various combinations of parts hereinafter particularly described and pointed out in the appended claims.

I will now proceed to a detailed description of my invention by aid of the accompanying drawings, wherein—

Figure 1 is a side elevation of the trap with cover 28 removed; Fig. 2 an end elevation of Fig. 1; Fig. 3 a plan of the trap with the top plate 27 and cover 28 for the actuating mechanism removed; Fig. 4 a sectional plan of the trap on line 4—4 of Fig. 2; Fig. 5 an elevation of the trap as seen from the front or on the opposite side to Fig. 1; Fig. 6 a view of the platform supporting spring 7; Fig. 7 a sectional elevation of the mechanism for actuating the trap drawn to an enlarged scale, 7—7 in Fig. 3 indicating the plane of section and Fig. 8 an end part sectional elevation of Fig. 7, 8—8 in Fig. 3 indicating the plane of section.

As illustrated more particularly in Figs. 1 to 6, the trap proper comprises a framework consisting of four vertical corner members 1, a top 2 and a bottom 3. The trap, as shown more particularly in Fig. 4, is constructed with a false bottom 4. A plate or part 5, which forms a portion of the false bottom 4 and is located at or about the center of the length of said false bottom 4, is hinged along one edge, as indicated at 6 in Fig. 4. 7 in Figs. 4 and 6 represents a spring one leaf of which is fixed to the bottom 3, while the other engages the under side of the hinged plate 5. Spring 7 serves for keeping the hinged plate 5 pressed upward and level with the top of the false bottom 4. The front of the trap (see Figs. 4 and 5) between the uprights or vertical corner members 1 and the top and bottom 2, 3, respectively, is covered or closed in with wire netting or other suitable material 8, which may be strengthened by vertical wires or rods 9 placed at suitable distances apart and fixed at their ends between the top 2 and bottom 3. At the other side of the trap, or opposite the wire netting or its equivalent 8 and between the top 2 and bottom 3, are rotatably supported two vertical and parallel solid or tubular rods 10, 11. The rods 10, 11, as shown— see Figs. 1 and 4—are preferably arranged equi-distant from each other and from the uprights 1 at the same side. The rods 10, 11, each carry a number of parallel and horizontal wires or bars 12. The wires or bars 12, fixed to the one rod or tube 10, are so arranged and spaced apart that they take up positions and work between wires 12 of the other rod or tube 11—as shown in the space between the rods 10, 11, in Fig. 1. The wires 12, carried by the rod or tube 10, project on the one side to within a short distance of the rod or tube 11, and on the other side to within a short distance of the upright 1. In like manner, the wires or bars 12 of the rod or tube 11 project on the one side to within a short distance of the rod or tube 10, and on the other side to within a short distance of the upright 1 at the opposite end of the trap.

As shown more particularly in Figs. 1 and 4, to each of the back uprights or vertical members 1, are fixed horizontal wires, rods or their equivalent 13. The wires 13, as shown in Fig. 4, are inwardly inclined or directed toward the rods 10, 11. The said wires 13 are so arranged and spaced apart that the wires 12, carried by the rotatable vertical rods or tubes 10, 11, take up positions and work between them when rods or tubes 10, 11, are rotated. The wires 13, as shown, project to within a short distance of the rods or tubes 10, 11,—as shown in Figs. 1 and 4. The wires 13, as shown in Figs. 1 and 2, may be connected in pairs at their outer ends, as indicated at 13ª. 12ª, in Fig. 1, represents a piece of wire fixed to the lower end of rod or tube 10 and shaped to fill a space left between the wires at the bottom of said rod or tube 10. To each of the front uprights or vertical members 1 are also fixed horizontal wires or rods 14 which are directed inward or toward the rods 10, 11, (see more particularly Fig. 4). These wires 14 are of such a length and so arranged and spaced apart that the wires 12 work at a short distance from and in different planes to them upon rotation of the rods or tubes 10, 11. Similar to the wires 13, wires 14 may be connected in pairs at their outer ends, as indicated at 14ª in Figs. 2 and 5. The ends of the trap between the uprights or members 1 are left open so that a free passage through the trap and over the hinged plate 5 is provided. 15 in Fig. 4 is a plate let into or secured upon the top of the false bottom 4, which plate serves for rotatably supporting the lower ends of the rods or tubes 10, 11. In the inner edge of the plate 15 is formed a slot 16 into which a projection 17 on the hinged plate 5 projects when said plate is in its normal position or flush with the top of the false bottom 4. To the bottom of the rod or tube 11 is fixed a plate 18 which is shaped to provide two horizontal arms 19, 20,—see Figs. 1 and 4. The outer ends of arms 19, 20, operate alternately by engaging the projection 17 to retain the rod 11 (and through the actuating mechanism, the rod 10) in normal position—as shown in Fig. 1—or with the wires 12 between the wires 13. The means for automatically actuating the trap or for rotating rods or tubes 10, 11, when plate 5 is depressed and catch 17 is caused to disengage arm 19 or 20 as the case may be, is shown positioned upon the top (2) of the trap, although it may be otherwise located.

The upper ends of the rods 10, 11, as shown more particularly in Fig. 7, project above the top 2, and they are preferably turned down or reduced in diameter, as shown. Upon the reduced upper ends 10ª, 11ª, of the rods 10, 11, respectively, are fixed toothed wheels 21, 22. Wheels 21, 22, are shown fashioned with hubs or sleeves 23, through the medium of which, they are fixed by means of pins 24, to the rods 10ª, 11ª, respectively. 25 are further pins for preventing movement of wheels 21, 22, upon their respective rods 10ª, 11ª.

26, 27, are two horizontal plates placed between the top 2, and a wooden or other suitable cover 28 for the actuating mechanism.

26ª—in Fig. 7—represent screws for fixing plate 26 to the top 2. Plates 26, 27, are maintained the requisite distance apart by means of distance pieces 29, which are threaded at the extremities, project through holes in the plates and secured in position by nuts 30. The top 2 and cover 28 are shown recessed at 31 to accommodate the ends of the distance pieces 29 and nuts 30. The reduced upper ends 10ª, 11ª, of rods 10, 11, pass through holes 32 in the plate 26 and at their upper ends enter and rotate in holes 33 in the top plate 27.

34 are pins for maintaining the upper ends 10ª, 11ª, in position in the holes 33.

35 is a spindle which is rotatably supported at its lower end in recess 36 in the bottom plate 26. The upper end of spindle 35 projects through a hole 37 in the top plate 27, and it is constructed with a square extremity 38 to receive the key 39 which is adapted to pass through a hole 40 in the cover 28 immediately above the spindle 35. The key 39 is used for winding up the actuating spring (42) hereinafter referred to.

41 is a pin which passes through spindle 35 and serves for keeping it in position between the plates 26, 27. 42 is a clock or similar spring which, when wound by means of key 39, serves for rotating spindle 35.

43 are rods which depend from plate 27 and serve for limiting the expansion of the spring. The rods 43 are secured to plate 27 in like manner to the distance pieces 29, and the cover 28 is shown recessed for the outer ends of said rods and their nuts, as previously described in connection with said pieces 29.

44 is a disk or ring arranged around the spindle 35 beneath spring 42. The ring 44 is constructed on the under side with a hollow cylindrical projection 45 encircling spindle 35.

46 is a pin for securing ring 44 to spindle 35 through projection 45. 47 is another disk or ring placed on top of the ring or disk 44 and secured thereto by means of screws 48.

49 is a ratchet wheel arranged around the projection 45 and secured to disks 44 and 47 by means of screws 48.

50 is a large wheel which is rotatably arranged around disk or ring 44 between disk or ring 47 and ratchet wheel 49. Wheel 50 is constructed of two different diameters, and around the larger diameter it is provided with ratchet teeth 51 and around the smaller diameter with ordinary gear-teeth 52. Teeth 52 directly mesh the teeth of wheel 21 on upper end 10ª of rod 10.

53 is a pawl which is fixed by means of screw 54 to the under side of wheel 50. Pawl 53 engages the teeth of the ratchet wheel 49—see Figs. 3 and 7—and operates to prevent unwinding of spring 42.

55 is a spring and 56 a screw fixing one end of said spring 55 to the under side of wheel 50. The other end of spring 55 is attached to pawl 53 so that it serves for keeping the pawl 53 in engagement with the teeth of wheel 49. When spindle 35 is rotated by the spring 42, then wheel 50 is rotated by means of ratchet wheel 49 and pawl 53. 57 is another spindle rotatably supported between the plates 26, 27 and retained in position by means of pin 57ª.

58 is a toothed wheel formed with a hub or sleeve 59 by which it is secured to spindle 57 by pin 60. Toothed wheel 58—see Fig. 3—meshes with the teeth 52 on the reduced circumference of wheel 50 and also with the teeth of wheel 22 on rod 11. As previously explained, in the one case teeth 52 mesh directly with the teeth of wheel 21, and in the other case drive wheel 22 through wheel 58 so that the rods 10, 11, are rotated in opposite directions, as indicated by the arrows in Fig. 3.

61—see Figs. 3 and 8—is a bracket carrying a pawl 62 which engages ratchet wheel 51 around the larger circumference of wheel 50.

63 is a pawl spring for maintaining pawl 62 in engagement with teeth 51. Pawl 62 serves to prevent wheel 50 from rotating in the opposite direction to that in which it is rotated by spring 42 through ratchet wheel 49 and pawl 53. This permits rods 10, 11, to be rotated only in the direction indicated by the arrows in Fig. 3. A cage 64—see Fig. 4—which may be of any suitable construction, is arranged at the back of the trap, in which the animals caught are imprisoned. Obviously, instead of using wire netting 8 at the front of the trap, the front may be completely closed in by panels or otherwise; and one end only may be left open instead of two.

In the operation of the trap, the animal enters at either of the open ends. If desired, any suitable bait may be placed on the hinged plate 5 or be suspended above it from the top 2 or otherwise as preferred. When the animal depresses the hinged plate 5, catch 17 is caused to disengage arm 19 (or 20). Spring 42 then comes into operation, and by rotating spindle 35, rings 44, 47, and ratchet wheel 49, the latter revolves wheel 50 through pawl 53. Wheel 50 in turn rotates wheels 21, 22, which revolves rods 10, 11, in the direction indicated by the arrows on the paths of the ends of the wires 12 in Fig. 4. The animal is then impelled through the passage provided between the rods 10, 11, into the cage arranged at the back of the trap. The trap is then automatically set by the hinged plate being raised by the spring 7 which places catch 17 in position to engage the arm 20 (or 19). The bars or wires 14 prevent the animal escaping through the ends of the cage once the rods 10, 11, commence to rotate. Should the animals attempt to escape after entering the cage they are unable to do so by pawl 62 preventing rotation of wheel 50 in the opposite direction to that in which it is rotated by spring 42.

What I claim as my invention and desire to protect by Letters Patent is:—

1. In an animal trap, in combination, a pair of vertical and parallel rods, means for rotating said rods in opposite directions, a plurality of horizontal and parallel bars carried by each rod, the bars of the one rod being so arranged and spaced apart that they can take up positions and work between the bars of the other rod, and a plurality of horizontal and parallel bars arranged at the outside of the rods, said bars being so arranged and spaced apart that the bars carried by the rotatable rods take up positions between them, and upon rotation of the rods pass between them, means for inclosing the trap at the front of the aforesaid rods, said means providing a passage leading to the front of the rods, a plurality of horizontal and parallel bars supported by the means inclosing the trap at the front, and means which are operated by the animal when it enters the passage at the front of the rods to automatically release the means for rotating the rods, as set forth.

2. In an animal trap, in combination, a frame, a pair of vertical and parallel rods, means for rotating said rods in opposite directions, a plurality of horizontal bars carried by each rod, the bars of the one rod being so arranged and spaced apart that they can take up positions and pass between the bars of the other rod, a plurality of stationary, horizontal and parallel bars carried by the frame at the outside of the rods, said stationary wires or bars being also so arranged and spaced apart that the bars carried by the rotatable rods can take up positions between them and upon rotation of the rods pass between them, means for inclosing the trap at the front of the aforesaid rotatable rods, said means providing a passage leading past the front of the rods, a plurality of further stationary, horizontal and parallel bars supported by the frame at the side of the passage opposite the first-mentioned stationary bars, said further stationary, horizontal and parallel bars being directed toward the rotatable rods, and means which are operated by the animal when it enters the passage at the front of the rods to automatically release the means for rotating the rods, as set forth.

3. In an animal trap, in combination, a pair of vertical and parallel rods, means for rotating said rods in opposite directions, a plurality of horizontal and parallel bars carried by each rod, the bars of the one rod being so arranged and spaced apart that they can take up positions and work between the bars of the other rod, and a plurality of horizontal and parallel bars arranged at the outside of the rods, said bars being so arranged and spaced apart that the bars carried by the rotatable rods take up positions between them, and upon rotation of the rods pass between them, mean for inclosing the trap at the front of the aforesaid rods, said means providing a passage leading to the front of the rods, a plurality of horizontal and parallel bars supported by the means inclosing the trap at the front, and means which are operated by the animal when it enters the passage at the front of the rods to automatically release the means for rotating the rods, said automatic releasing means comprising a plate hinged in the floor of the passage, a spring beneath said plate, a catch on said plate and a pair of arms fixed to one of the rotatable rods adapted to engage the aforesaid catch, as set forth.

In testimony whereof I have signed my name to this specification in the presence of two subscribing witnesses.

JACOBUS VAN DER WALT.

Witnesses:
 CHAS. OVERDALE,
 MAUD POPE.

---

Copies of this patent may be obtained for five cents each, by addressing the "Commissioner of Patents, Washington, D. C."